US006983095B2

(12) United States Patent
Reagan et al.

(10) Patent No.: US 6,983,095 B2
(45) Date of Patent: Jan. 3, 2006

(54) SYSTEMS AND METHODS FOR MANAGING OPTICAL FIBERS AND COMPONENTS WITHIN AN ENCLOSURE IN AN OPTICAL COMMUNICATIONS NETWORK

(75) Inventors: Randy Reagan, Marlborough, MA (US); Jeff Gniadek, Northbridge, MA (US); Thomas Parsons, Leominster, MA (US)

(73) Assignee: Fiber Optic Network Solutions Corporation, Marlborough, MA (US)

( * ) Notice: Subject to any disclaimer, the term of this patent is extended or adjusted under 35 U.S.C. 154(b) by 0 days.

(21) Appl. No.: 10/714,814

(22) Filed: Nov. 17, 2003

(65) Prior Publication Data
US 2005/0105873 A1 May 19, 2005

(51) Int. Cl.
G02B 6/00 (2006.01)
(52) U.S. Cl. ..................................................... 385/135
(58) Field of Classification Search ................ 385/134, 385/135, 136, 137
See application file for complete search history.

(56) References Cited

U.S. PATENT DOCUMENTS

| 6,188,687 | B1 | | 2/2001 | Mussman et al. ........... 370/388 |
| 6,278,829 | B1 | * | 8/2001 | BuAbbud et al. ........... 385/135 |
| 6,363,200 | B1 | * | 3/2002 | Thompson et al. .......... 385/135 |
| 6,452,925 | B1 | | 9/2002 | Sistanizadeh et al. ....... 370/352 |
| 6,453,033 | B1 | | 9/2002 | Little et al. ................. 379/219 |
| 6,480,487 | B1 | | 11/2002 | Wegleitner et al. ......... 370/354 |
| 6,577,595 | B1 | | 6/2003 | Counterman ................ 370/230 |
| 6,597,670 | B1 | | 7/2003 | Tweedy et al. ............. 370/328 |
| 6,760,531 | B1 | * | 7/2004 | Solheid et al. .............. 385/135 |
| 6,792,191 | B1 | * | 9/2004 | Clapp et al. ................ 385/135 |
| 2002/0034290 | A1 | | 3/2002 | Pershan ................. 379/207.02 |
| 2003/0174996 | A1 | | 9/2003 | Henschel et al. ........... 385/135 |
| 2004/0228598 | A1 | | 11/2004 | Allen et al. ................. 385/135 |

FOREIGN PATENT DOCUMENTS

| EP | 0871047 | 10/1998 |
| EP | 0975180 | 1/2000 |
| WO | 02103429 | 12/2002 |

* cited by examiner

Primary Examiner—Chandrika Prasad
(74) Attorney, Agent, or Firm—Harrity & Snyder LLP

(57) ABSTRACT

The preferred embodiments of the present invention include an optical splitter module having connectorized pigtails that are stored on the bulkhead faceplate of the module. The module includes an optical splitter output harness, for example, a ribbon cable assembly attached to the bulkhead with rugged strain relief mechanism. The ribbon harness is converted to individual pigtails with connectors which are stored on adapter receptacles on the faceplate. Adapter receptacles used may optionally be half receptacles when storage is the only desired function or may be full receptacles when access to the pigtail ferrule tip is required. Access to the ferrule tip may be required for attaching fiber optic terminators to eliminate undesirable reflections caused by unterminated connectors. The module provides an administrative location for splitter outputs prior to being connected individually into service. The module also provides an administrative storage location for splitter outputs taken out of service as a temporary staging area before being reassigned and connected individually into service again.

35 Claims, 15 Drawing Sheets

Fiber Distribution Hub
Side-by-Side Equipment Layout

SYSTEMS AND METHODS FOR MANAGING OPTICAL FIBERS AND COMPONENTS WITHIN AN ENCLOSURE IN AN OPTICAL COMMUNICATIONS NETWORK

BACKGROUND OF THE INVENTION

In Fiber-to-the-Premises broadband network applications optical splitters are used to split the optical signals at various points in the network. Recent network specifications call for optical splitters to be incorporated in Fiber Distribution Hubs which are re-enterable outdoor enclosures. These enclosures allow easy re-entry for access to optical splitters allowing splitter ports to be utilized effectively and for additional splitter ports to be added on an incremental basis.

In typical applications to date, optical splitters are provided prepackaged in optical splitter module housings and provided with splitter outputs in pigtails that extend from the module. The splitter output pigtails are typically connectorized with high performance low loss SC or LC connectors. This optical splitter cassette provides protective packaging for the optical splitter components in the housing and thus provides for easy handling for otherwise fragile splitter components. This approach allows the optical splitter modules to be added incrementally to the Fiber Distribution Hub, for example, as required.

A problem arises due to the lack of protection and organization of the connectorized ends of the splitter output pigtails. These pigtails can sometimes be left dangling in a cable trough or raceway within the enclosure. This method of leaving an exposed optical component such as a high performance connector exposed in an open area leaves it susceptible to damage. The high performance connectors if damaged can cause delays in service connection while connectors are repaired. Leaving connectorized splitter output pigtails dangling in a cabling trough also exposes them to dirt and debris in the cabling trough. In current network deployments it is imperative to maintain clean optical connectors to maximize the performance of the network.

In addition, the fiber pigtails in the current art are not organized in a manner conducive to rapid service delivery. In many cases the splitters may have sixteen or thirty-two output pigtails bundled together making it difficult to find a particular pigtail. Also the bundle of loose hanging pigtails can easily become entangled causing further delays in service delivery. The tangles can actually cause congestion and in some cases result in bend induced loss on the pigtails resulting in overall lower system performance.

To solve some of these issues a separate storage tray or enclosure has been utilized to take up slack and/or store and protect splitter output pigtail connectorized ends. However, these auxiliary devices tend to take up additional space and often hide the pigtail in an enclosure that can cause further delays in deployment depending on how much time is required to access on the tray or enclosure. Thus, there still remains a need for a solution that does not take up additional space and that provides direct access and identification to splitter output pigtail ends.

In addition, some network applications may require equipping splitter outputs with fiber optic terminators in order to eliminate reflections caused by unterminated splitter outputs. Other methods of storing connectorized pigtails in cable troughs or auxiliary trays may make it difficult to equip splitter output ports with fiber optic terminators.

Finally current methods tend to result in a disassociation of the splitter module from the splitter output pigtail end. This usually results because the pigtail once deployed gets lost in the midst of other pigtails in the fiber jumper trough. When subscribers are taken out of service it is desirable to disconnect the splitter output and redeploy or store it for ready redeployment. It is further desirable for administrative purposes to maintain association of splitter module to splitter output pigtails so that resources are used effectively over time.

SUMMARY OF THE INVENTION

A preferred embodiment of the present invention is directed to a fiber distribution hub enclosure in an optical fiber-to-the-premises network having a subscriber patch shelf in the enclosure that includes a plurality of termination connectors to form a termination field, and an optical splitter shelf in the enclosure having a plurality of optical splitter modules. The optical splitter modules have a plurality of splitter output pigtail ends wherein the pigtail ends are connectorized and administratively located directly on a splitter module bulkhead.

The preferred embodiments of the present invention include an optical splitter module having connectorized pigtails that are stored on the bulkhead faceplate of the module. The module includes an optical splitter output harness, for example, is a ribbon cable assembly attached to the bulkhead with rugged strain relief mechanism. The ribbon harness is converted to individual pigtails with connectors which are stored on adapter receptacles on the faceplate. Adapter receptacles used may optionally be half receptacles when storage is the only desired function or may be full receptacles when access to the pigtail ferrule tip is required. Access to the ferrule tip may be required for attaching fiber optic terminators to eliminate undesirable reflections caused by unterminated connectors. The module provides an administrative location for splitter outputs prior to being connected individually into service. The module also provides an administrative storage location for splitter outputs taken out of service as a temporary staging area before being reassigned and connected individually into service again.

Another aspect of the present invention includes a method for installing optical splitter modules and associated fixed length output pigtails, storing the connectorized ends of the pigtails in a position ready for deployment and then individually connecting the splitter outputs as required to connect service to subscriber terminations. Upon installing the splitter module the output pigtails are initially routed circumferentially around the subscriber termination field, connected in a storage position and slack from the pigtails is managed in the vertical channel. When a connect service order occurs, the process first verifies if there is an optical splitter output port available and if not adds splitter modules to the system. If splitter outputs are available the method includes disengaging pigtails from the storage position, connecting the splitter output pigtail to the subscriber termination, routing pigtail slack through a reduced circumferential path and storing slack in half-loops in the adjacent channel. If a subscriber is disconnected from service the splitter output is disengaged from the subscriber termination, routed through an expanded circumferential path and connected to the original storage receptacle at the splitter module.

Thus, preferred embodiments of the present invention include configuring a fiber distribution hub with optical splitter modules having fixed length connectorized pigtails. The preferred embodiments address positioning the optical splitter modules relative to other fiber terminations needing access to the optical splitter ports. Another aspect of the preferred embodiments include installing the pigtails in a configuration that requires minimum pigtail rearrangement and slack yet allowing for enough slack to reach any of the fiber terminations requiring access to splitter ports. Another aspect of the preferred embodiments includes optimally routing the pigtails to minimize and preferentially eliminate congestion and controlling slack within set limits of the enclosure. In a preferred embodiment, all pigtails have the same length for ease of manufacturing. Splitter modules, all having the same pigtail length, also allow ease of flexibility for allowing a splitter module to be installed in any available slot within a patch panel without regard to sequential order.

Preferred embodiments of the present invention also provide a method of fiber management in the enclosure such that congestion does not occur due to rearrangement and churn. The embodiment minimizes the slack and any chance of blocking access because of fiber entanglement. Further, the embodiment allows for churn over time including initial pigtail storage, service connection, service disconnection and repeat storage to provide ready access to pigtails for future use. The methods in accordance with the preferred embodiments, are non-blocking and non-congesting for jumpers routed into cable pathways and fiber patch panels. The methods of the preferred embodiment are fully contained within the confines of the enclosure.

An aspect of the present invention includes a communications network including a headend configured to select source material feeds of a local feed, a long distance feed, a broadcast feed, a central office operatively coupled to the headend via a communications trunk and a plurality of fiber distribution hubs operatively coupled to the network. The fiber distribution hubs include at least one termination shelf, at least one splitter shelf having a plurality of optical splitter modules and a channel for fiber management. The fiber distribution hub further includes a plurality of splitter output connectorized pigtail ends located on a bulkhead of at least one optical splitter module. The pigtail ends are located on adapter ports on the bulkhead. The optical splitter module further comprises a ribbon harness extending from the module.

The foregoing and other features and advantages of the systems and methods for fiber distribution and management will be apparent from the following more particular description of preferred embodiments of the system and method as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The preferred embodiments of the present invention are directed to an optical splitter module that is equipped with adapters for storing connectorized optical splitter pigtail ends. Adapters are administratively located on the optical splitter module bulkhead, for example, but not limited to, in octal count arrangements ideally suited to identify splitter ports having sixteen or thirty-two output ports. The adapters in accordance with preferred embodiments are used to store or stage the connectorized ends of the optical splitter for rapid location, identification, easy access and removal of pigtail output ends. In accordance with preferred embodiments, the optical splitter outputs extending from the bulkhead on the module are wrapped back and secured to adapters on the splitter bulkhead. The preferred embodiments also include methods for installing optical splitter modules and associated fixed length output pigtails, storing the connectorized ends of the pigtails in a position ready for deployment and then individually connecting the splitter outputs as required to connect service to subscriber terminations.

Figure 1:
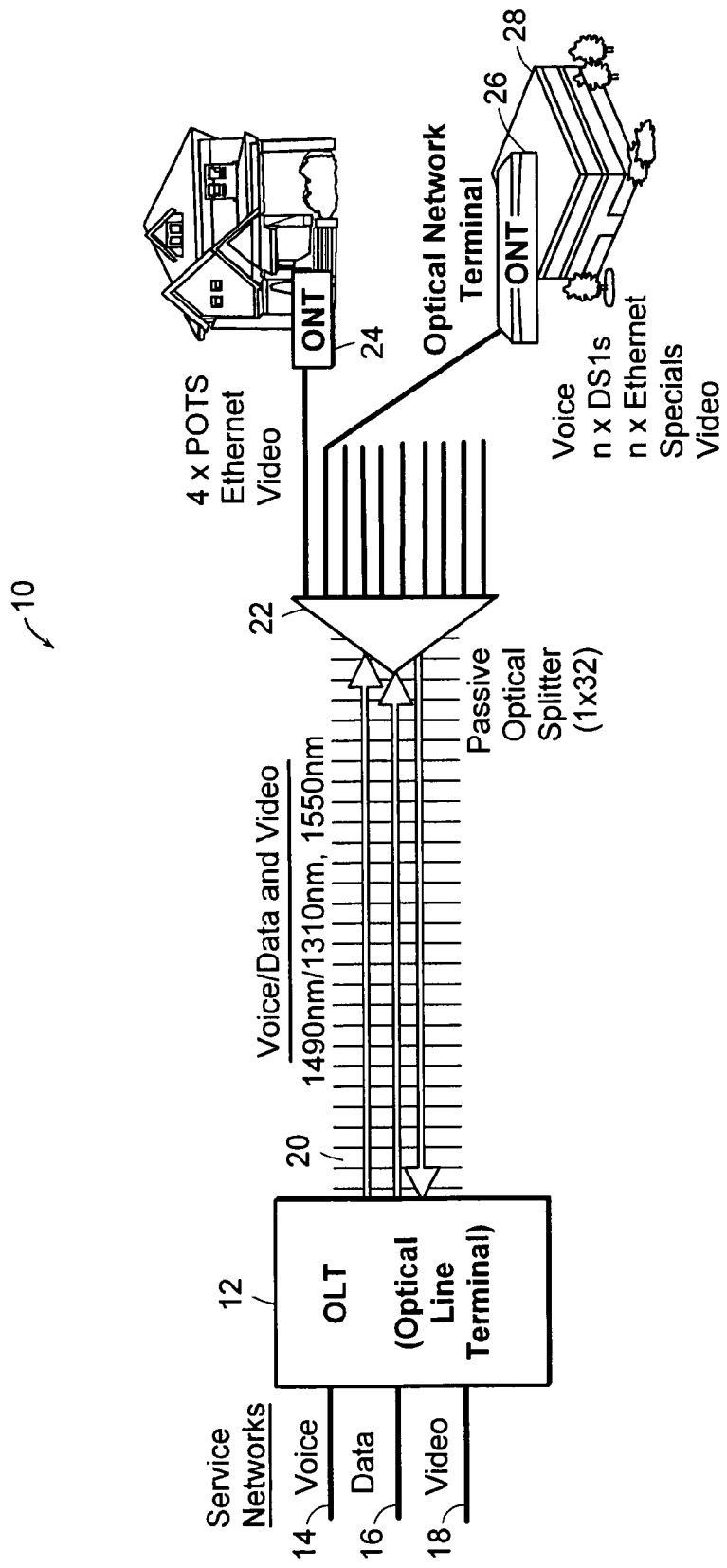
FIG. 1 illustrates schematically a broadband access network, for example, a fiber-to-the-premises (FTTP) network using passive optical network (PON) components in accordance with a preferred embodiment of the present invention.

FIG. 1 illustrates schematically a broadband access network 10, for example, a Fiber-to-the-Premises (FTTP) network using passive optical network (PON) components in accordance with a preferred embodiment of the present invention. The architecture can be a point to multi-point PON construction, which utilizes 1:32 splitters at a fiber hub enclosure within the distribution area. The architecture can be fiber rich 1:1 distribution between the fiber hub and a customer's premise. The broadband services capability of the network to distribute source information include, for example, data signals (622 Mbps×155 Mbps (shared)), and video signals (860 MHz, ~600 analog and digital channels, high definition television (HDTV), and video on demand (VOD)). Signaling is accomplished using wavelength division multiplexing (WDM) and fiber sharing. The network includes the optical network terminals 26 that are scalable, provide high bandwidth, multi-service applications that serve residences and small/medium businesses. The network includes passive components that are located outside the plant and require minimal maintenance.

The broadband access network includes digital subscriber plug-in line cards that have a broadband terminal adapter configured for receiving a digitally multiplexed broadband data stream and outputting a plurality of demultiplexed broadband data streams for the respective subscriber loops.

Figure 2:
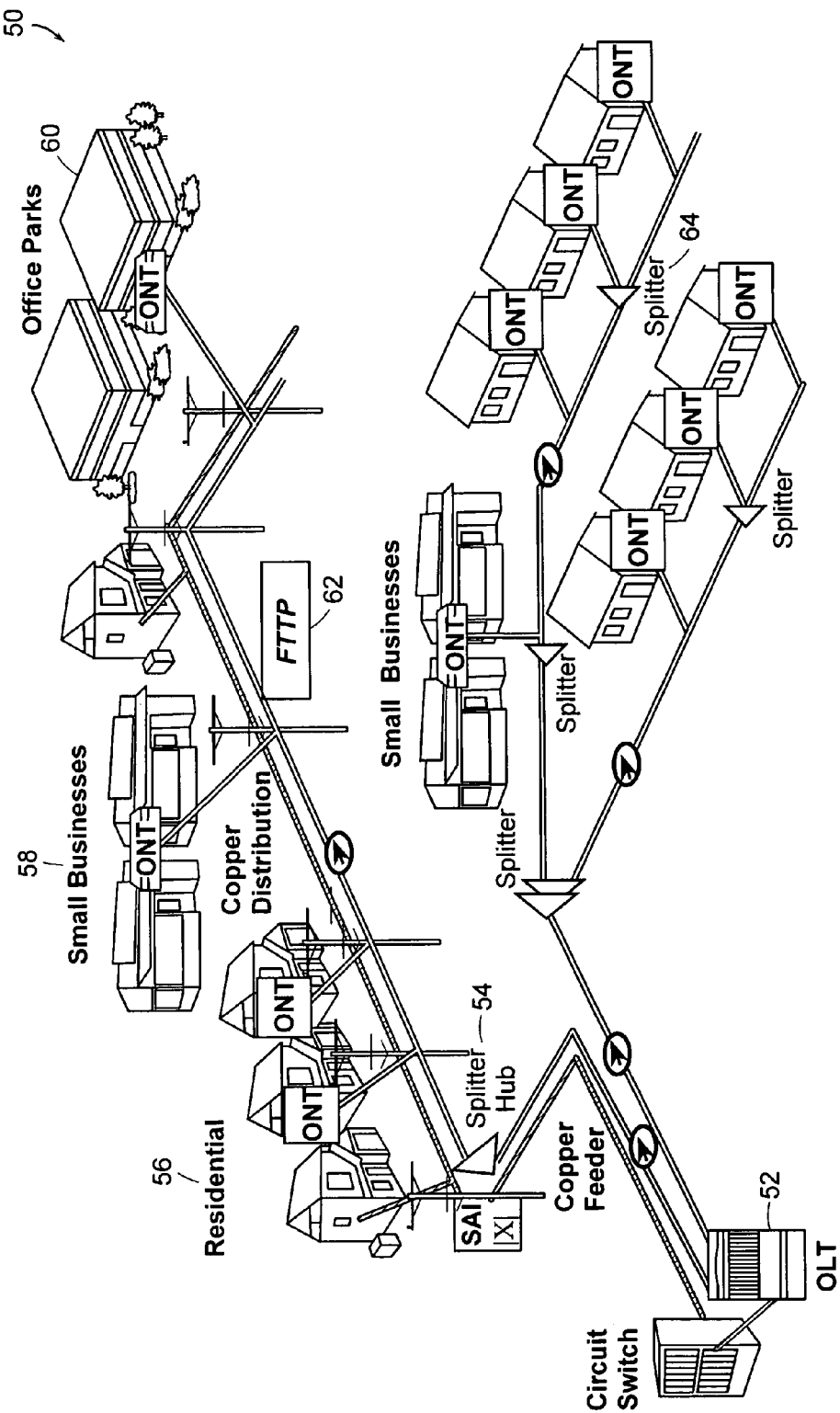
FIG. 2 illustrates schematically further details of an FTTP network in accordance with a preferred embodiment of the present invention.

FIG. 2 illustrates schematically further details of an FTTP network 50 in accordance with a preferred embodiment of the present invention. In Fiber-to-the-Premises broadband network applications optical splitters 64 are used to split the optical signals at various points in the network. In the FTTP networks optical splitters are typically located in both indoor and outdoor environments including a Central Office/Head End, environmentally secure cabinets, enclosures or drop terminals. In some outdoor applications, optical splitters have been deployed in tightly sealed environmental closures that are not easily re-enterable. Preferred embodiments of the present invention provide optical splitters enclosures to effectively utilize splitter ports or to incrementally deploy additional splitters as the need arises. Preferred embodiments include optical splitters incorporated in Fiber Distribution Hubs 54 which are re-enterable outdoor enclosures. These enclosures allow easy re-entry for access to optical splitters allowing splitter ports to be utilized effectively and for additional splitter ports to be added on an incremental basis.

Preferred embodiments of the present invention include optical splitters that are provided prepackaged in optical splitter module housings that are mounted in a fiber patch panels to facilitate routing of jumpers interconnected from fibers in adjacent subscriber ports to the splitter outputs. This optical splitter cassette provides protective packaging and thus easy handling for otherwise fragile splitter components. The optical splitter modules can be added incrementally to the patch panel.

FTTP broadband networks are designed to achieve low optical insertion loss in order to achieve maximum network reach from electronics having fixed power output. Each optical component and subsystem utilized in the network is optimized to provide minimum insertion loss. The optical loss budget in a preferred embodiment is approximately 23 to 25 dB with 1:32 passive splitting. The components and factors contributing to the optical loss include splitters (1:32, single or cascaded), WDMs, connectors (optical line terminal (OLT), FDF, splitters, drop, ONT), fiber attenuation (at least three wavelengths: 1310 nm, 1490 nm, 1550 nm), and splicing.

The splitter hub 54 serves at least 128 splitter ports/ premises. It includes multiple distribution cables, connectorized or fusion between splitter and distribution. The preferred embodiments of the present invention provide efficient fiber connection and management with easy access, and low maintenance requirements. The splitter hubs of the preferred embodiments are pole or ground mountable. The drop terminals can be with or without splitters and include various number of drops, both aerial and buried.

In preferred embodiments, optical connectors are used in the network to provide the desired flexibility however they are restricted to those points in the network where flexibility is absolutely required. Optical connectors are required to provide flexible access to optical splitter outputs. The preferred embodiments of the present invention provide connector flexibility and yet minimize optical loss using the optical splitter module with connectorized pigtails. The pigtails have standard SC or LC type connectors on the ends.

Figure 3:
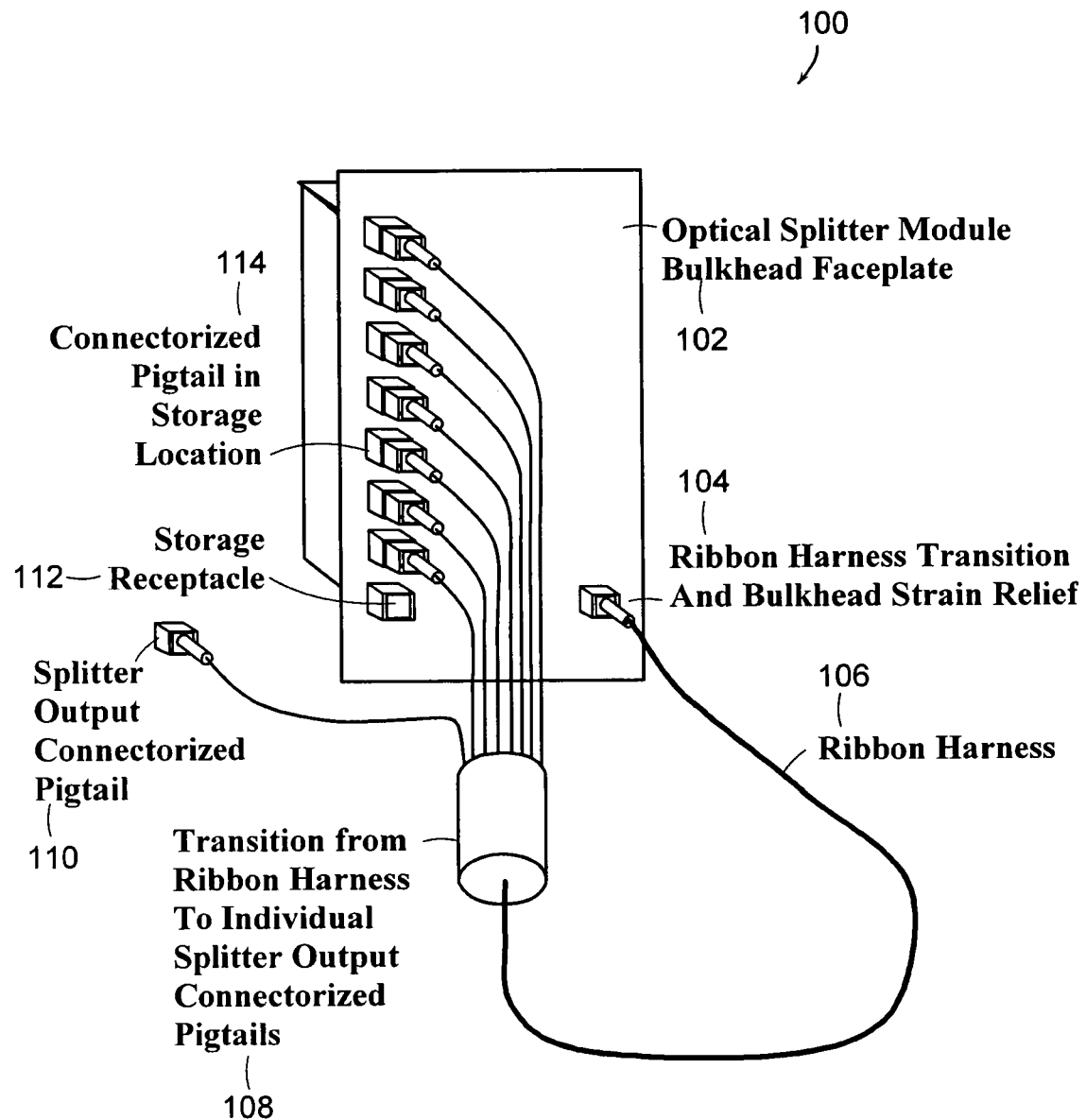
FIG. 3 illustrates an optical splitter module in a fiber distribution network having connectorized pigtails in accordance with a preferred embodiment of the present invention.

FIG. 3 illustrates an optical splitter module 100 in a fiber distribution network having connectorized pigtails in accordance with a preferred embodiment of the present invention. The module 100 includes a bulkhead faceplate 102 having storage receptacles 112. In a preferred embodiment, the optical splitter module 100 provides for a high density ribbon cabling harness 106 to protect the splitter outputs extending from the splitter module. The optical splitter module ribbon harness 106 is secured to the module with a strain relief mechanism 104 to provide high pull strength and bend radius control. The compact nature of the ribbon harness 106 allows for higher packing density and better space utilization in the cabling trough. The module harness is converted to individual pigtails with connectors to allow splitter outputs to be administered and rearranged individually.

The module 100 may be equipped with either half non-functional adapters or full functioning adapters as a means for storing pigtail ends. In preferred embodiment, the half non-functional adapters are used in applications not requiring fiber optic terminators but for storage functionality. The full functional adapters are used in applications requiring connection of fiber optic terminators to the optical splitter output port. Access to the pigtail ferrule tip may be required for attaching fiber optic terminators to eliminate undesirable reflections caused by unterminated connectors. The module provides a home position from which optical splitter output pigtails can be deployed and where they can be returned to once taken out of service. This administrative use of adapters provides protection for the connectorized pigtails ends, maintains cleanliness of the connector ends, and enables rapid service connection and deployment.

The preferred embodiments of the present invention address configuring a Fiber Distribution Hub with Optical Splitter Modules having fixed length connectorized pigtails. One aspect of the preferred embodiment determines where to position the optical splitter modules relative to other fiber terminations needing access to the optical splitter ports. The preferred embodiments also addresses installing the pigtails in a configuration that requires minimal pigtail rearrangement and slack yet allowing for enough slack to reach any of the fiber terminations requiring access to splitter ports. The methods of installing optical splitter module pigtails include determining how to route the pigtails in order to provide an optimal routing scheme that does not get congested and wherein slack can be controlled within set limits of the enclosure. The methods in accordance with a preferred embodiment of the present invention include making all pigtails the same length for ease of manufacturing and ordering by the customer. Splitter modules all having the same pigtail length also allow ease of flexibility for allowing a splitter module to be installed in any available slot within the patch panel without regard to sequential order.

A preferred embodiment of the method for installing the splitter module pigtails also provides for fiber management in the enclosure so that rearrangement and churn does not congest this management. To accomplish this, the slack and any chance of blocking access because of fiber entanglement is minimized. The preferred embodiments allow for churn over time including initial pigtail storage, service connection, service disconnection and repeat storage to provide ready access to pigtails for future use. The methods of the present invention are non-blocking and non-congesting for jumpers routed into cable pathways and fiber patch panels.

The method of a preferred embodiment is fully contained within the confines of the enclosure.

Figure 4A:
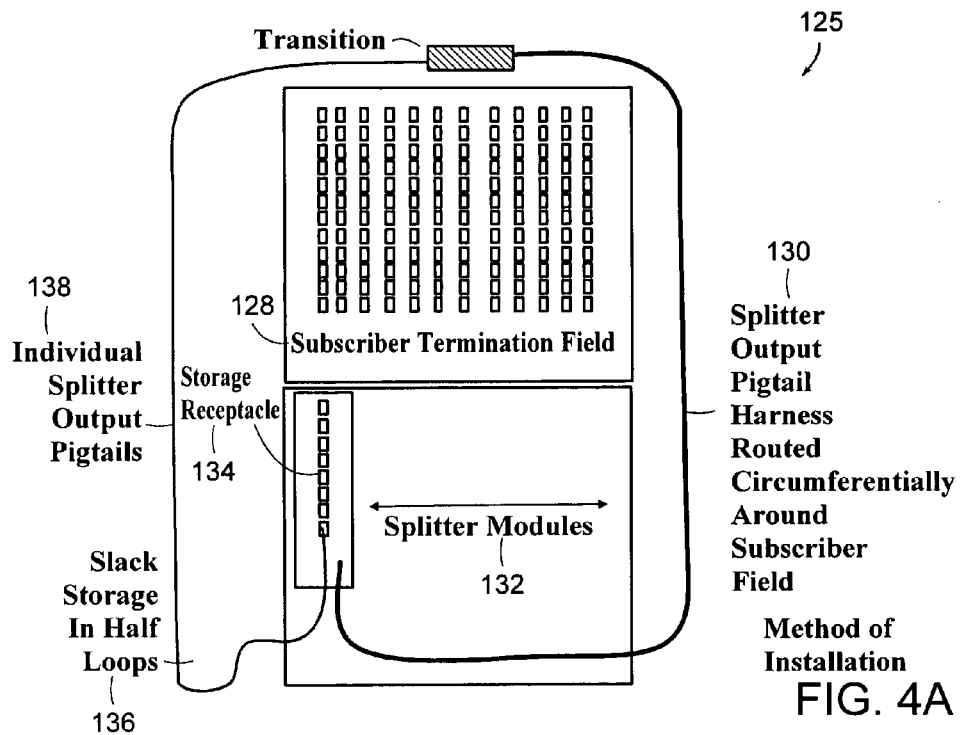
FIG. 4A schematically illustrates the installation of the optical splitter module pigtails in accordance with a preferred embodiment of the present invention.

FIG. 4A schematically illustrates the installation of the optical splitter module pigtails in accordance with a preferred embodiment of the present invention. A preferred embodiment of the present invention includes a cabling installation method 125 including splitter modules incrementally installed on a shelf adjacent to a subscriber termination field 128. The connectorized pigtails 138 from the splitter modules 132 having fixed identical length are routed in a circumferential path 130 surrounding the subscriber termination field 128. The connectorized ends of the pigtails are stored at a position on the front of the splitter module 134. The method in accordance with a preferred embodiment employs a fan through placement so that the splitter module pigtails can be installed without disturbing installation of pigtails already connected to subscriber terminations. This installation method in accordance with a preferred method of the present invention also ensures that the splitter module can be preconfigured with the pigtail connectors in the storage position and left in the storage position throughout the pigtail installation process.

Figure 4B:
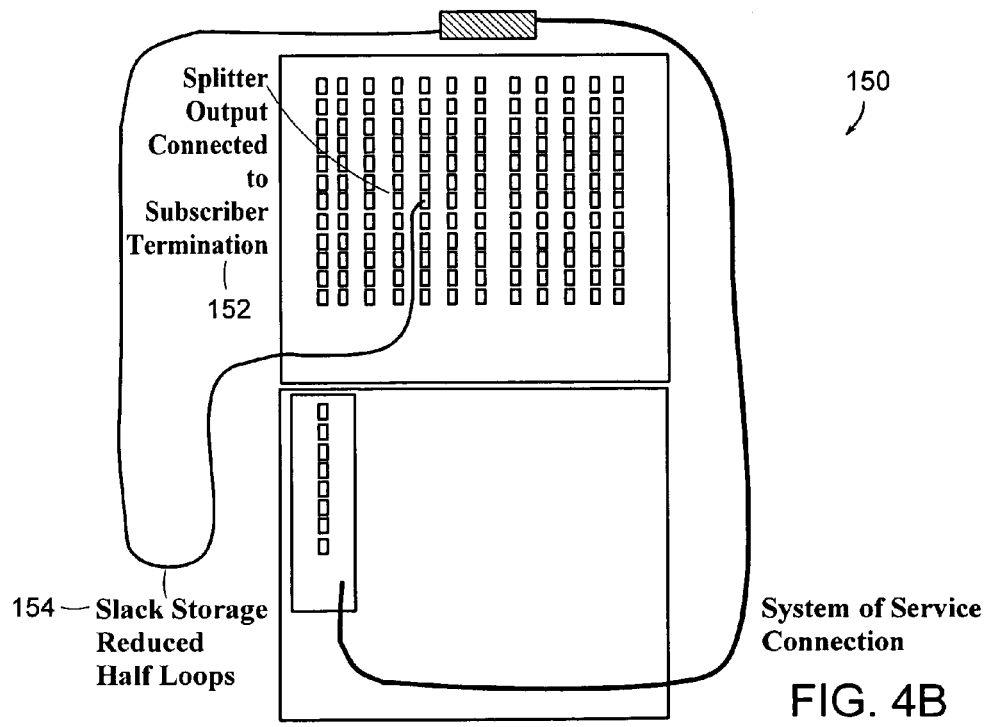
FIG. 4B schematically illustrates the service connection configuration of the optical splitter module in accordance with a preferred embodiment of the present invention.

FIG. 4B schematically illustrates the service connection configuration 150 of the optical splitter module in accordance with the preferred embodiment of the present invention shown in FIG. 4A. The preferred embodiments of the present invention, include a service connection method to connect a subscriber into service by first disconnecting an individual splitter output pigtail from the storage position and then routing the pigtail to the desired subscriber port 152. Since the pigtail harness has been preconfigured and routed circumferentially around the subscriber termination the pigtail inherently reaches any of the desired subscriber ports within the target population by simply reducing the circumferential path distance. By reducing the circumferential path the pigtail slack exhibits additional slack. The additional slack may be taken up using slack-half loops in the vertical channel where the pigtails are routed. The random nature of connecting splitter output pigtails to subscriber ports result in a family of various size half-loops 154 that are managed in the vertical channel within the confines of the cabinet.

Figure 5A:
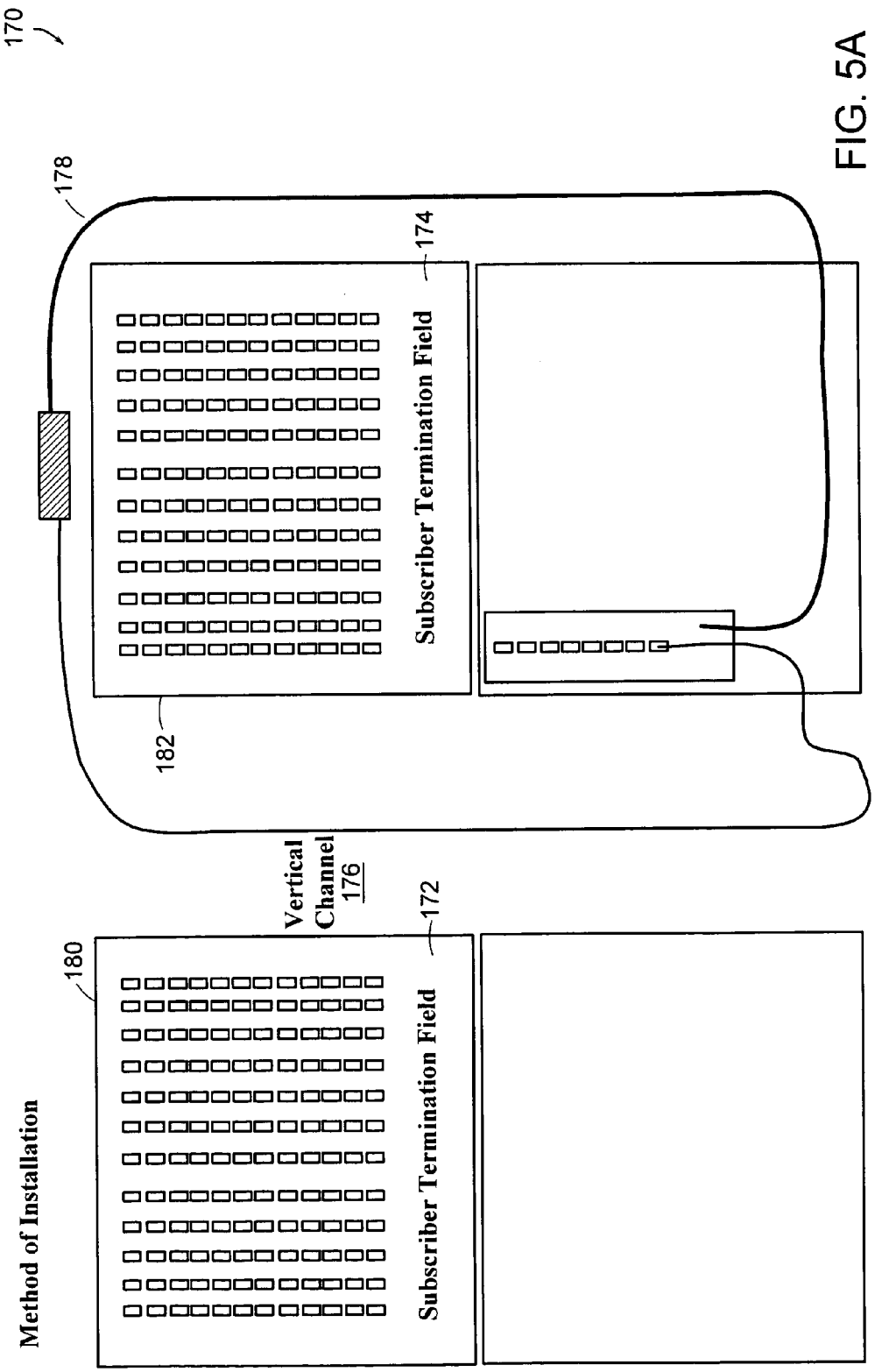
FIGS. 5A and 5B schematically illustrate the installation of the optical splitter module pigtails and the service connection configuration of the optical splitter module, respectively, in a network having modules adjacent to each other in accordance with a preferred embodiment of the present invention.
Figure 5B:
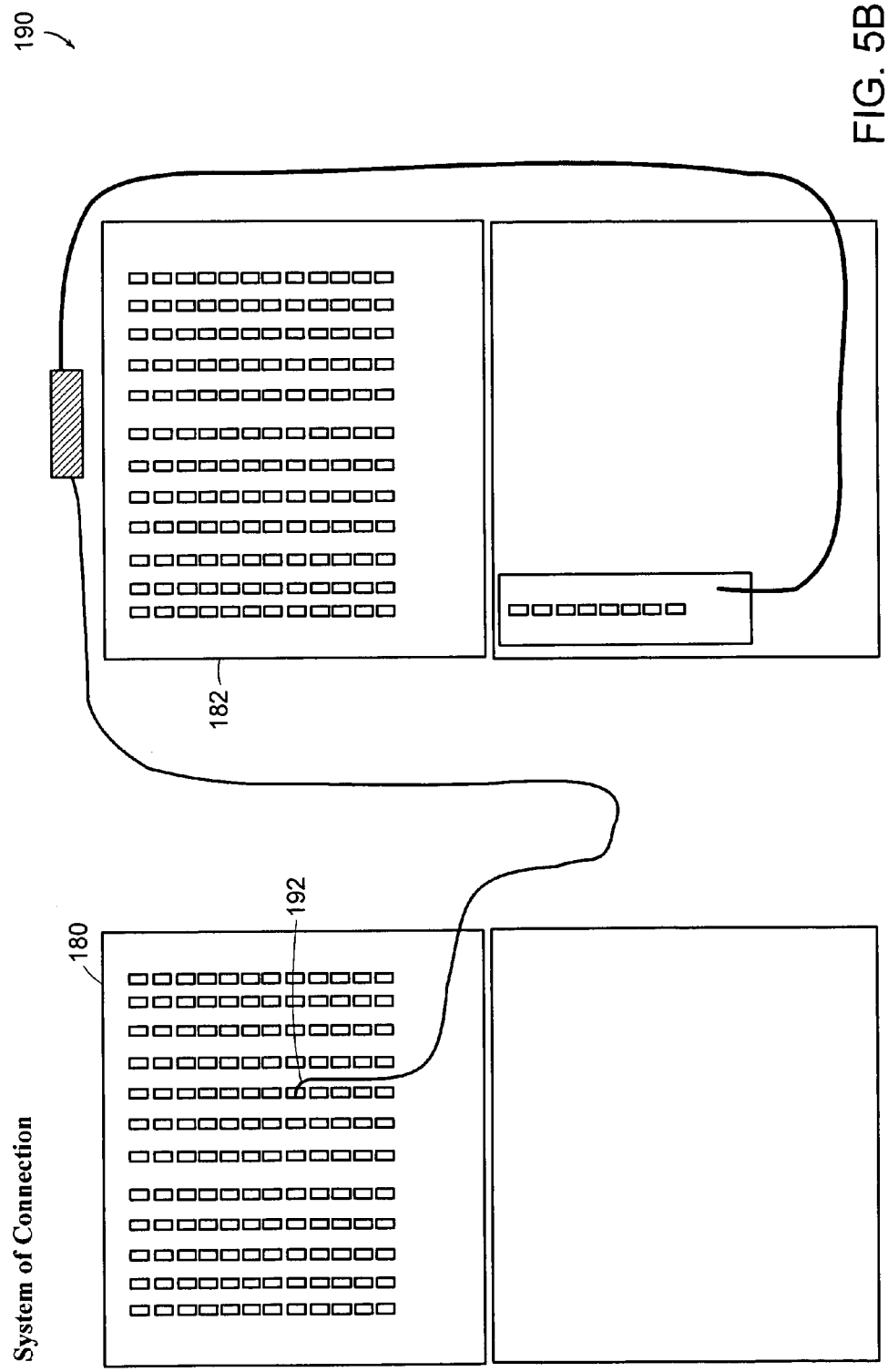

FIGS. 5A and 5B schematically illustrate the installation of the optical splitter module pigtails and the service connection configuration of the optical splitter module, respectively, in a network having modules adjacent to each other in accordance with a preferred embodiment of the present invention. A preferred embodiment of the present invention includes a method to connect subscriber ports that are in an adjacent field but not initially contained within the circumference of the splitter pigtail harness. In this extension the splitter output pigtail is routed to the adjacent field which by virtue of a juxtaposed position has a path at the same distance to the subscriber port within the circumference. The subscriber ports in the adjacent field also are assigned randomly therefore the resultant slack is managed using a family of various size half-loops in the vertical channel 176.

Figure 5C:
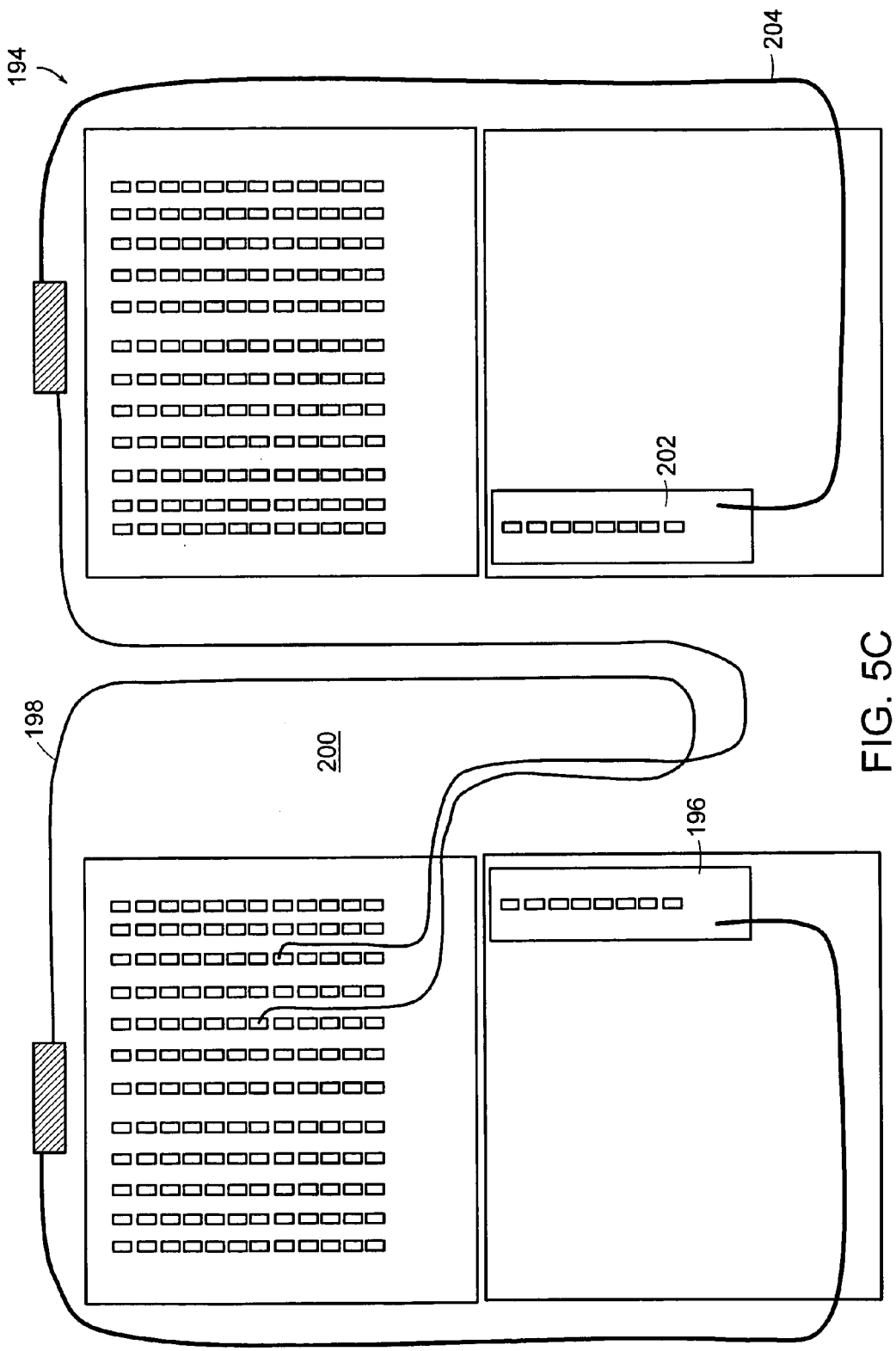
FIGS. 5C and 5D schematically illustrate the service connection configurations between adjacent fiber distribution hubs in accordance with alternate preferred embodiments of the present invention.
Figure 5D:
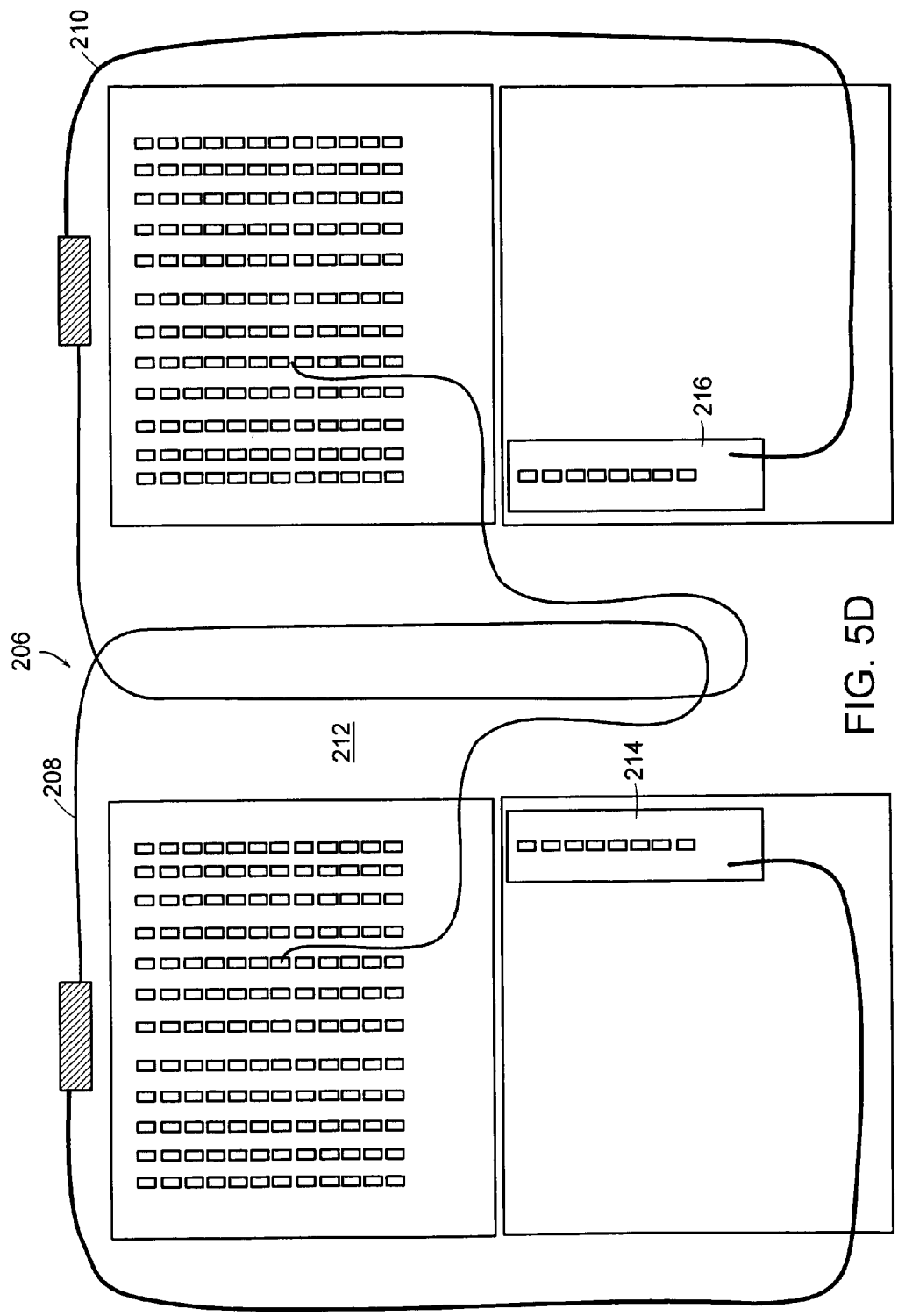

FIGS. 5C and 5D schematically illustrate the service connection configurations 194, 206 of the termination and splitter fields in adjacent fiber distribution hubs in accordance with a preferred embodiment of the present invention. The pigtails 198, 208 of the left module 196, 214 are routed circumferentially clockwise while the right pigtails 204, 210 of the module 202, 216 are routed circumferentially counterclockwise in a preferred embodiment. The fiber distribution hubs in this embodiment are located adjacent to one another, each having a splitter shelf with splitter modules and a termination shelf. The counter rotating feed provide for routing of the splitter module output pigtails circumferentially around the subscriber termination fields. The pigtail slack is stored in the vertical channels 200, 212.

A preferred embodiment includes a method of removing a splitter pigtail from a subscriber port and either redeploying that output pigtail to a new subscriber or storing the pigtail back to the original storage position at the splitter module. The method is completely non-blocking and non-congesting due to the planned slack management.

Figure 6:
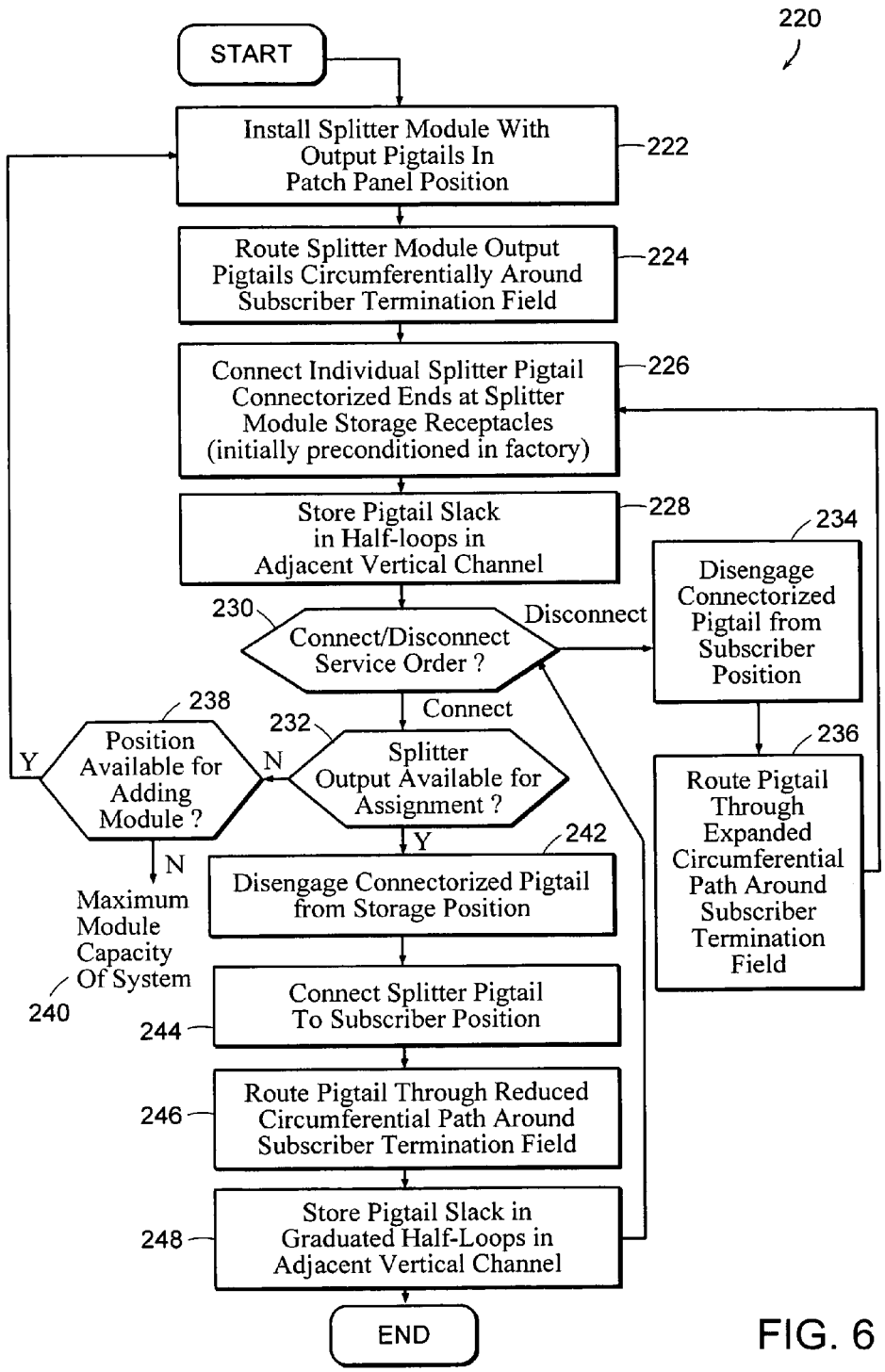
FIG. 6 is a flow chart illustrating a method for installing and connecting optical splitter module pigtails in accordance with a preferred embodiment of the present invention.

FIG. 6 is a flow chart illustrating a method for installing and connecting optical splitter module pigtails in accordance with a preferred embodiment of the present invention. The method includes the step 222 of installing a splitter module with output pigtails in a patch panel position. Further, the method includes the step 224 of routing the splitter module output pigtails circumferentially around a subscriber termination field. The method includes the step 226 of connecting an individual splitter pigtail connectorized ends at splitter module storage receptacles. These storage receptacles can be initially preconditioned in the factory. The method includes a next step 228 of storing the pigtail slack in half-loops in an adjacent vertical channel. Further, the method includes the step 230 of deciding whether to connect or disconnect the service order. If a service order needs to be connected, the method includes the decision in step 232 of determining if a splitter output is available for assignment. If it is determined that the splitter output is available for assignment then the method progresses to step 242 of disengaging connectorized pigtail from the storage position. If it is determined that the splitter output is not available per step 238 then it is determined if a position is available for adding a module. If yes, then the method steps are reiterated starting back from step 222. If, however, it is determined that there is no position available then the maximum module capacity of the system has been reached.

The method also includes the option of disconnecting the service order per step 234. The step 234 includes disengaging the connectorized pigtail from the subscriber position and per step 236 routing the pigtail through an expanded circumferential path around the subscriber termination field 236.

The method further includes the step 244 of connecting the splitter pigtail to the subscriber position and the step 246 of routing the pigtail through a reduced circumferential path around the subscriber termination field. The method includes the step 248 of storing the pigtail slack in graduated half-loops in an adjacent vertical channel.

FIGS. 7A–7E illustrate views of an fiber distribution hub in accordance with a preferred embodiment of the present invention. The fiber distribution hub (FDH) in accordance with a preferred embodiment administers connections between fiber optic cables and passive optical splitters in the Outside Plant (OSP) environment. These enclosures are used to connect feeder and distribution cables via power splitters providing distributed service in a FTTP network application. The preferred embodiment FDH provides a vital cross-connect/interconnect interface for optical transmission signals at a location in the network where fiber hubbing, operational access and reconfiguration are important requirements. In addition the FDH is designed to accommodate a range of sizes and fiber counts and support factory installation of pigtails, fanouts and splitters.

Figure 7A:
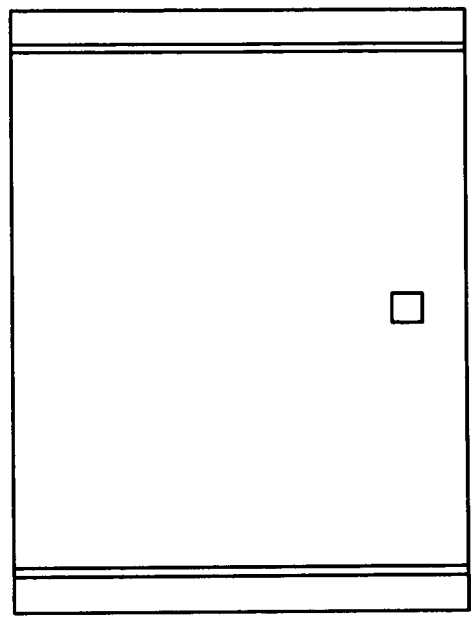
FIGS. 7A–7E illustrate views of the fiber distribution hub in accordance with preferred embodiments of the present invention.
Figure 7B:
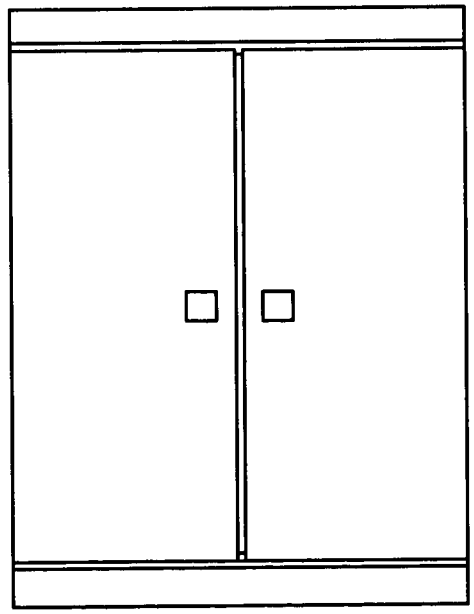
Figure 7C:
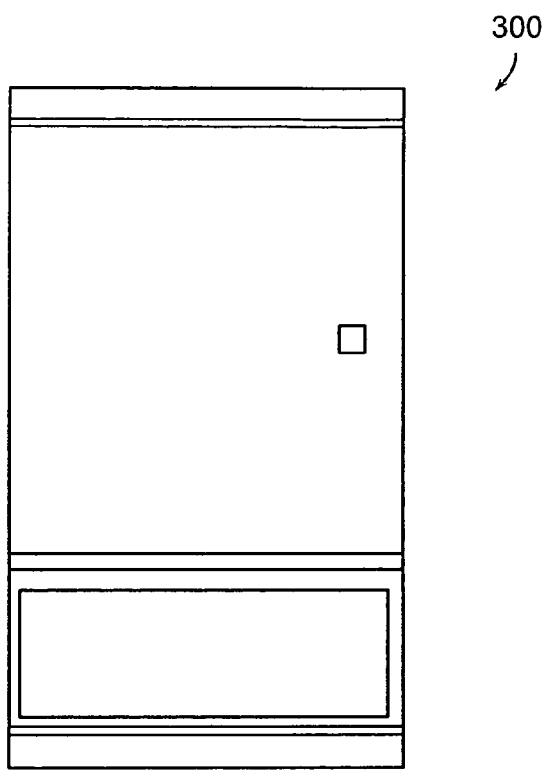
Figure 7D:
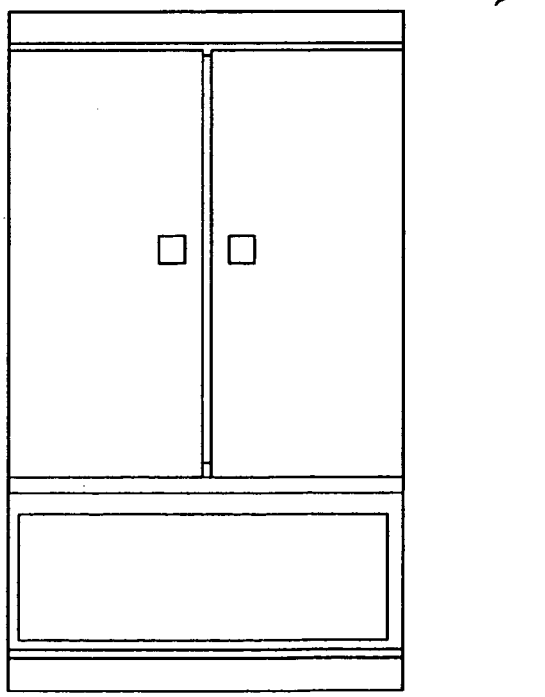
Figure 7E:
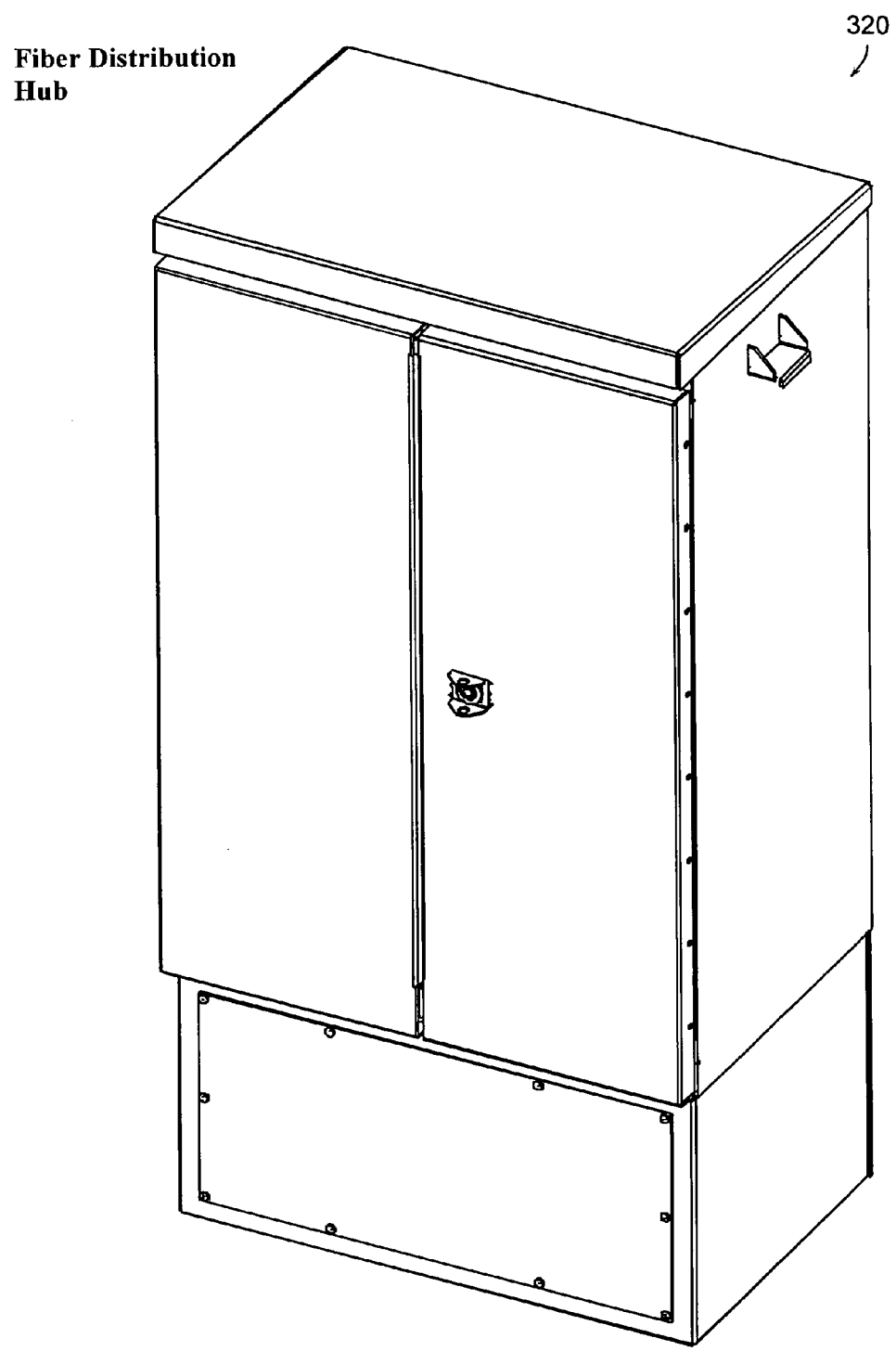

In a preferred embodiment, the FDH enclosure is designed for front access via a two-door configuration (FIG. 7E). The FDH provides termination, splicing, interconnection and splitting in one compartment. The unit accommodates either metallic or dielectric OSP cables via sealed grommet entry. Cables are secured with standard grip clamps. The FDH provides grounding for metallic members and for the cabinet.

The enclosure provides environmental and mechanical protection for cables, splices, connectors and passive optical splitters. These heavy gauge aluminum enclosures are NEMA-4X rated and provide the necessary protection against rain, wind, dust, rodents and other environmental contaminants. At the same time, they remain lightweight for easy installation, and breathable to prevent accumulation of moisture in the unit. The aluminum construction with a heavy power coat finish also provides for corrosion resistance. The enclosure is accessible through secure doors that are locked with standard tool or pad-lock.

In accordance with preferred embodiments, the FDH is provided in pole mount or pedestal mount configurations. The same cabinet and working space is available in both pole mount (FIGS. 7A and 7B) and pedestal mount units (FIGS. 7C, 7D and 7E). Three sizes of the fiber distribution hubs are available, for example, to correspond to three different feeder counts, for example, 144, 216 and 432.

Figure 8:
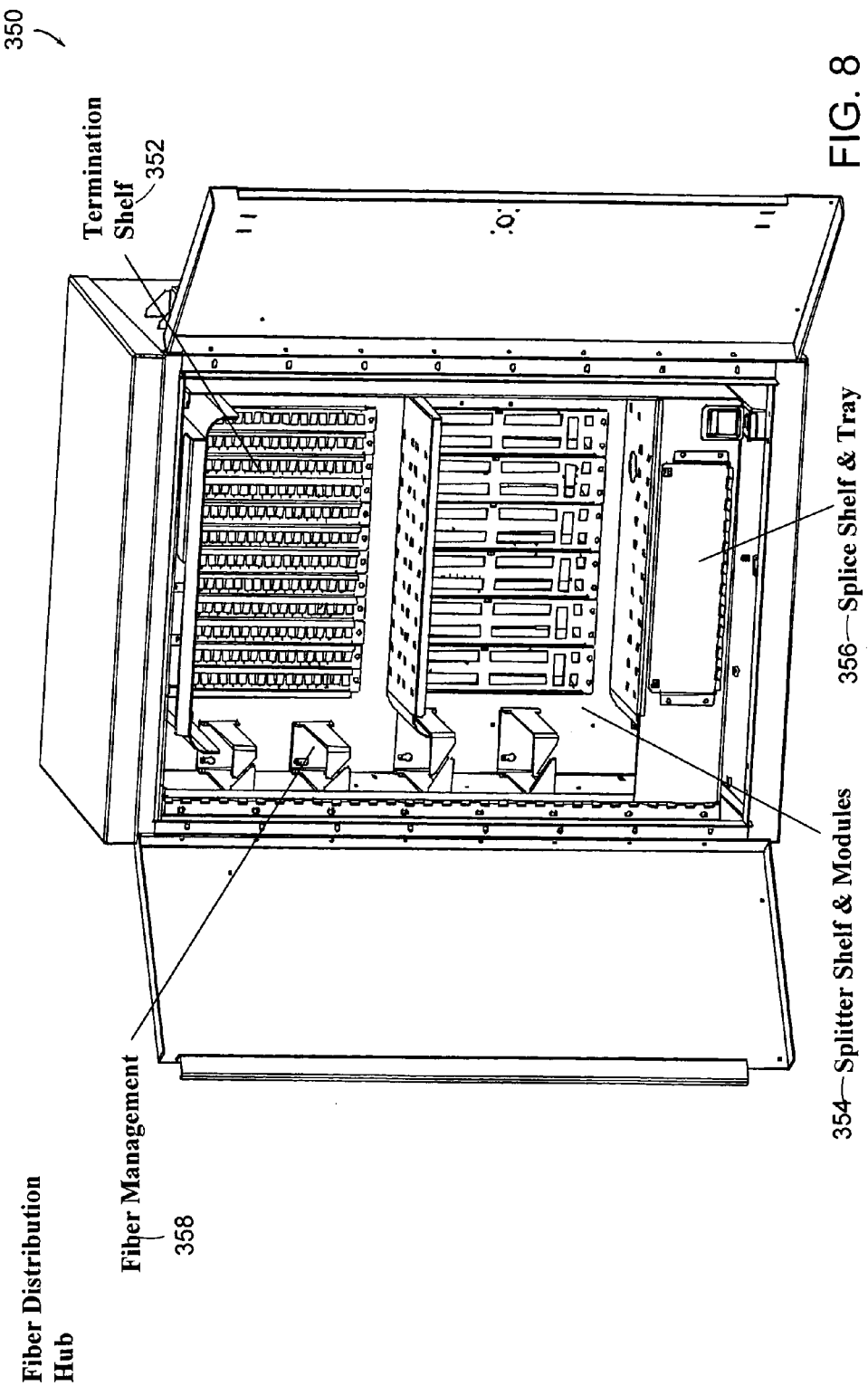
FIG. 8 illustrates a view of the internal components of a fiber distribution hub enclosure in accordance with a preferred embodiment of the present invention.

FIG. 8 illustrates a view of the internal components of a fiber distribution hub enclosure 350 in accordance with a preferred embodiment of the present invention. The FDH enclosure 350 can be configured in a number of different ways to support fiber cable termination and interconnection to passive optical splitters. The configuration illustrated in the preferred embodiment provides for a termination shelf 352, a splitter shelf and optical component modules 354 and a channel for fiber management 358.

The termination shelf 352 can be based on the standard main distribution center (MDC) enclosure line that provides complete management for fiber terminations in accordance with a preferred embodiment of the present invention. In a preferred embodiment, the termination shelf is preterminated in the factory with a stub cable containing either 144-fibers, 216-fibers or 432-fibers. This stub cable is used to connect services to distribution cables routed to residences. The distribution fibers are terminated on certified connectors. The termination shelf uses standard 12-pack or 18-pack adapter panels, for example, that have been ergonomically designed to provide easy access to fiber terminations in the field. The panels can be mounted on a hinged bulkhead to allow easy access to the rear for maintenance. The fiber jumpers are organized and protected as they transition into the fiber management section 358 of the enclosure.

The splitter shelf 354 can be based on a standard fiber patch panel that accepts standard optical component modules (OCM) holding optical splitters in accordance with a preferred embodiment of the present invention. In a preferred embodiment, the splitter cassettes are designed to simply snap into the shelf and therefore can be added incrementally as needed. The splitter shelf serves to protect and organize the input and output fibers connected to the cassettes. Splitter shelves are available in various sizes and the shelf size can be optimized for different OCM module configurations.

Figure 9:
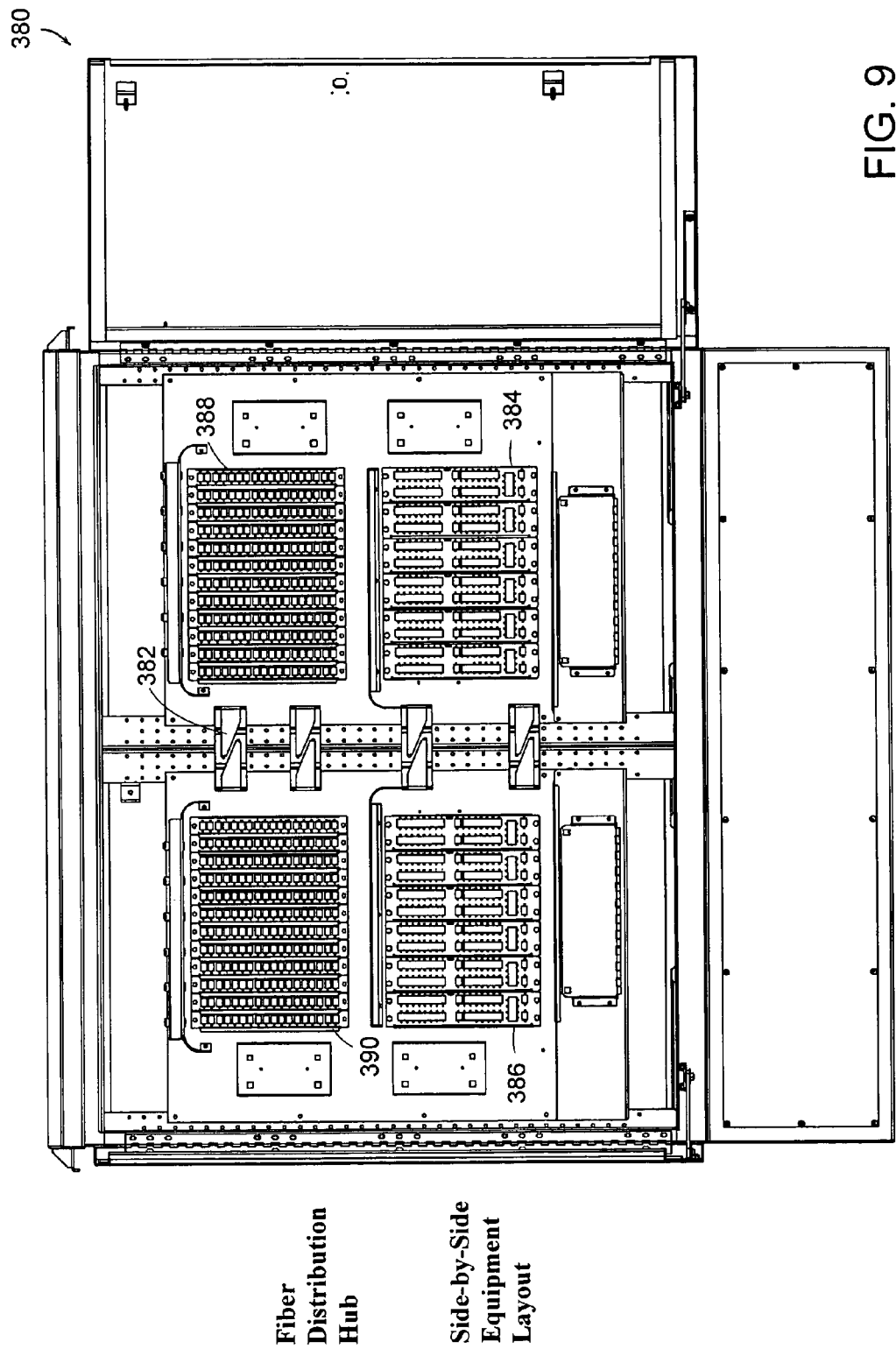
FIG. 9 illustrates a schematic view of a fiber distribution hub enclosure having a side-by-side equipment configuration in accordance with a preferred embodiment of the present invention.

FIG. 9 illustrates a schematic view of a fiber distribution hub enclosure 380 having a side-by-side equipment configuration in accordance with a preferred embodiment of the present invention. There are two adjacent termination shelves 388, 390 and two adjacent splitter shelves 384, 386, separated by a central fiber management channel 382 in accordance with a preferred embodiment of the present invention.

Figure 10:
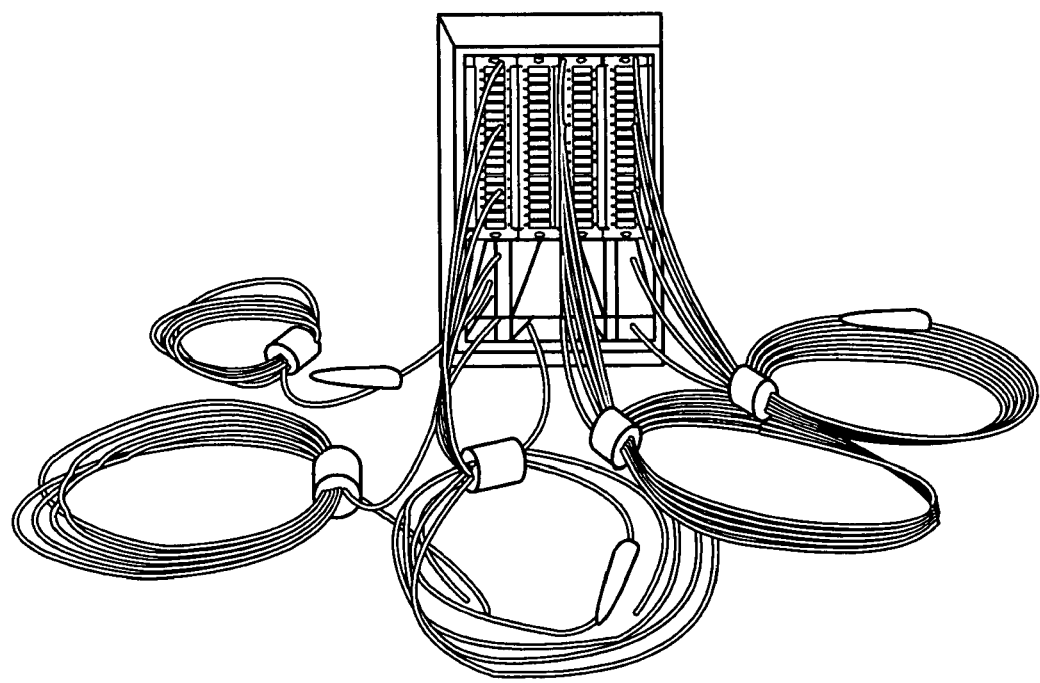
FIG. 10 illustrates a view of the optical component modules used in a fiber distribution hub enclosure in accordance with a preferred embodiment of the present invention.

FIG. 10 illustrates a view of the optical component modules in a fiber distribution hub enclosure in accordance with a preferred embodiment of the present invention. The FDH configuration in a preferred embodiment provides for fiber management hardware on one side of the cabinet. This allows fiber jumpers to be routed between the termination shelf and the splitter shelf. Excess slack can be managed on the side of the cabinet using slack loops.

In accordance with a preferred embodiment, OCM modules can also be equipped with pigtails to reduce the number of connections in the network. The module shown in FIG. 10 contains a 1×32 splitter with pigtails provided on the input and 32 outputs. The connectorized ends of the pigtails are stored on bulkhead adapters on the front of the module. These storage adapters provide a familiar locating scheme for spare pigtails so that connector ends can be quickly identified and connected to distribution fibers. The spacing on the adapters is the same as on standard connector panels.

In preferred embodiments, OCM modules can also be equipped with standard terminators. Modules terminated with bulkhead adapters may be equipped with terminators on the front of the module. Modules connected via pigtails and equipped with storage adapters are equipped with terminators on the rear of the panel.

The claims should not be read as limited to the described order or elements unless stated to that effect. Therefore, all embodiments that come within the scope and spirit of the following claims and equivalents thereto are claimed as the invention.

What is claimed is:

1. A fiber distribution hub in an optical fiber-to-the-premises network comprising:
an enclosure;
a subscriber patch shelf in the enclosure and having a plurality of termination connectors to form a termination field; and
an optical splitter shelf in the enclosure and having a plurality of optical splitter modules, the optical splitter modules having a plurality of splitter output pigtail ends wherein the pigtail ends are connectorized and administratively located directly on a splitter module bulkhead.

2. The fiber distribution hub of claim 1, further comprising extending splitter output pigtails having ends that are staged initially on adapter ports located on the splitter module bulkhead.

3. The fiber distribution hub of claim 1, further comprising a ribbon harness extending from the optical splitter shelf, said harness affixed to the optical splitter shelf and having a strain relief adapter that provides a higher level of pull strength on the cable and an improved bend radius control.

4. The fiber distribution hub of claim 1, further comprising a ribbon harness extending from the optical splitter shelf to provide a higher level of packaging density on the splitter module bulkhead and to allow space for a plurality of storage adapters on the splitter module bulkhead.

5. The fiber distribution hub of claim 1, further comprising a harness extending from the optical splitter shelf having a ribbon cable at a bulkhead transition for increasing packing density in a cabling trough.

6. The fiber distribution hub of claim 1, further comprising a harness constructed partially of ribbon cable and with breakout to a plurality of individual jacketed pigtails allowing each splitter port to be administered individually.

7. The fiber distribution hub of claim 1, further comprising storing the plurality of splitter output pigtail ends on the bulkhead for purposes of staging the ends for rapid deployment.

8. The fiber distribution hub of claim 1, further comprising a full adapter for each of the plurality of splitter output pigtail ends to be stored on the bulkhead and to provide access to the tip of the connector for connecting a fiber optic terminator.

9. The fiber distribution hub of claim 1, further comprising a plurality of adapter receptacles that can be configured for providing access to a connector ferrule tip inside the module.

10. The fiber distribution hub of claim 1, further comprising a hinged shelf for opening the plurality of splitter modules for purposes of installing or removing fiber optic terminators.

11. The fiber distribution hub of claim 1, further comprising a plurality of half adapter receptacles.

12. A method for configuring an enclosure for use in distributing optical signals in a communications network, the method comprising:
  installing a first optical splitter module having a first plurality of output pigtails each having a connectorized end;
  routing the first plurality of pigtails circumferentially around a first subscriber termination field located within the enclosure, the first subscriber termination field comprising a plurality of subscriber terminations, the routing further performed in a manner not substantially obstructing access to the plurality of terminations; and
  storing the connectorized ends of the first plurality of pigtails in a like plurality of stored positions ready for deployment.

13. The method of claim 12 wherein the first plurality of pigtails are fixed length pigtails.

14. The method of claim 13 wherein members of the first plurality of pigtails, respectively, have slack associated therewith, the slack facilitating interaction with at least a subset of the plurality of subscriber terminations.

15. The method of claim 14 wherein the slack associated with members of the first plurality of pigtails is managed in a vertical channel associated with the enclosure.

16. The method of claim 12 further comprising:
  receiving a connect order associated with a member of the plurality of subscriber terminations.

17. The method of claim 16 further comprising:
  determining if at least one of the plurality of pigtails is available; and
  connecting the at least one of the plurality of pigtails to the member of the plurality of subscriber terminations if the at least one of the plurality of pigtails is available.

18. The method of claim 16 further comprising:
  adding a second optical splitter module if the at least one of the first plurality of pigtails is unavailable.

19. The method of claim 17 wherein the connecting step further comprises:
  routing slack associated with the at least one of the first plurality of pigtails through a reduced circumferential path; and storing the slack in a half-loop.

20. The method of claim 14 further comprising:
  removing one of the plurality of connectorized ends from the stored position and coupling the one of the plurality of connectorized ends to an adjacent subscriber termination located within a second subscriber termination field proximate to the first subscriber termination field, the second subscriber termination field located so as to cause the slack associated with the removed end to be substantially similar to slack associated with at least one other of the plurality of pigtails.

21. The method of claim 20 wherein the first and second termination fields are located within a single fiber distribution hub.

22. The method of claim 21 wherein the fiber distribution hub comprises a single access door for allowing re-entry into the fiber distribution hub.

23. The method of claim 21 wherein the fiber distribution hub comprises two access doors for allowing re-entry into the fiber distribution hub.

24. The method of claim 21 wherein the first and second termination fields are mounted on hinges, respectively, for pivoting the first and second termination fields to expose connectors located behind the first and second termination fields.

25. The method of claim 19 further comprising:
  installing a second splitter module having a second plurality of pigtails each having a connectorized end; and
  routing the second plurality of pigtails circumferentially around the first termination field in a manner that does not substantially interfere with a substantial number of the first plurality of pigtails.

26. The method of claim 25 wherein the first and second splitter modules are installed according to increments, the increments for facilitating determination of where the first and second splitter modules should be placed.

27. The method of claim 26 wherein the first plurality of pigtails includes a first transition section and the second plurality of pigtails includes a second transition section.

28. The method of claim 27 wherein the first transition section is located between a first ribbon harness and the first plurality of pigtails and the second transition section is located between a second ribbon harness and the second plurality of pigtails.

29. The method of claim 28 wherein the first transition section is mounted a fixed distance away from the first splitter module along the circumferential path and the second transition is mounted a fixed distance away from the second splitter module such that the locations of the first and second transition sections are substantially co-located.

30. The method of claim 19 wherein the enclosure is a fiber distribution hub.

31. The method of claim 30 wherein the fiber distribution hub comprises a single access door for allowing re-entry into the fiber distribution hub.

32. The method of claim 29 wherein the fiber distribution hub comprises two access doors for allowing re-entry into the fiber distribution hub.

33. The method of claim 29 wherein the first and second termination fields are pivotally mounted on hinges, respectively.

34. The method of claim 12 wherein the subscriber termination field is pivotally mounted using a hinge for facilitating access to a rear portion of the subscriber termination field.

35. The method of claim 12 wherein the subscriber termination field and the optical splitter module are supported in a frame pivotally mounted to the enclosure using a hinge.

* * * * *